United States Patent
Olmsted

(10) Patent No.: US 6,850,164 B2
(45) Date of Patent: Feb. 1, 2005

(54) AIR LEAK DETECTION SYSTEM AND METHOD

(75) Inventor: Clifford C. Olmsted, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/264,218

(22) Filed: Oct. 3, 2002

(65) Prior Publication Data

US 2004/0074286 A1 Apr. 22, 2004

(51) Int. Cl.⁷ .............................................. G08B 21/00
(52) U.S. Cl. ................. 340/605; 340/606; 340/611; 340/602; 340/645.1
(58) Field of Search ............................ 340/605, 606, 340/611, 645.1, 602; 73/40, 40.5, 49.3, 46; 138/97, 93

(56) References Cited

U.S. PATENT DOCUMENTS

| 4,202,201 A | * | 5/1980 | Johnson | 73/40 |
| 4,238,953 A | * | 12/1980 | Laverman | 73/40.7 |
| 4,297,687 A | * | 10/1981 | Fuzzell | 340/626 |
| 5,217,165 A | * | 6/1993 | Takahashi et al. | 239/102.2 |
| 5,345,812 A | * | 9/1994 | Haboian | 73/46 |
| 5,404,747 A | * | 4/1995 | Johnston et al. | 73/40 |
| 5,785,323 A | * | 7/1998 | Heinzen | 277/582 |
| 6,170,320 B1 | * | 1/2001 | Scaringe et al. | 73/40.7 |

* cited by examiner

Primary Examiner—Hung Nguyen
(74) Attorney, Agent, or Firm—Black Lowe & Graham PLLC

(57) ABSTRACT

A system and method are provided for detecting leaks between a door and a primary seal of a vehicle. The system includes a mist generator that generates a mist and an illuminating device for illuminating any condensed mist on at least one of the primary seal or the door. The generator includes an output nozzle that is inserted at a predetermined distance from the door and the primary seal.

6 Claims, 3 Drawing Sheets

AIR LEAK DETECTION SYSTEM AND METHOD

FIELD OF THE INVENTION

This invention relates generally to integrity testing and, more specifically, to determining aircraft integrity.

BACKGROUND OF THE INVENTION

Pressurized systems, such as aircraft, depend in part upon integrity of seals to prevent leaks. For example, aircraft passenger doors include an inner liner or seal and an outer primary seal that are separated from each other by a distance of up to about eight (8) inches or so. The presence of the inner seal and the distance of separation between the inner seal and the outer seal introduce challenges in accurately pinpointing locations of any leaks past the outer seal. Further, detection of leaks past the outer seal are not feasible while an aircraft is in flight. One current method of leak detection uses a device that listens for any high-pitched noises that may indicate a leak. This method is inaccurate because it is difficult to determine exactly where the origin of the noise caused by the leak. For example, during flight door leaks on the outer seal may be detected in one location outside the inner seal while the actual leak on the primary seal is in a different location. Because there does not exist an accurate ground or in-flight test, subsequent test flights must be performed in order to verify that a leaky seal has been repaired. This resultant rework greatly increases production time and costs and delays.

Therefore, there exists a need for an easy-to-use tool and method for detecting leaks on the primary seal of a door used in an air pressurized system.

The present invention provides an air leak detection system and method that reduces rework of leaking seals and reduces additional flight testing of aircraft due to inaccurate seal detection by current known leak detection systems and methods.

SUMMARY OF THE INVENTION

The present invention provides a system and method for detecting leaks between a door and a primary seal of a vehicle. In one embodiment, the system includes a fluorescent dye mist generator that generates a mist from a fluorescent dye solution and a fluorescent illuminating device for illuminating any condensed fluorescent dye on at least one of the primary seal or the door. The mist generator includes an output nozzle that is inserted at a predetermined distance from the primary seal.

In one embodiment, an inner seal is located inboard of the primary seal of the vehicle, and the output nozzle is inserted past the inner seal.

The fluorescent dye mist generator may further include a container configured to receive the output nozzle, and a misting unit mounted within the container. Also, a fan is mounted to the container, if desired.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
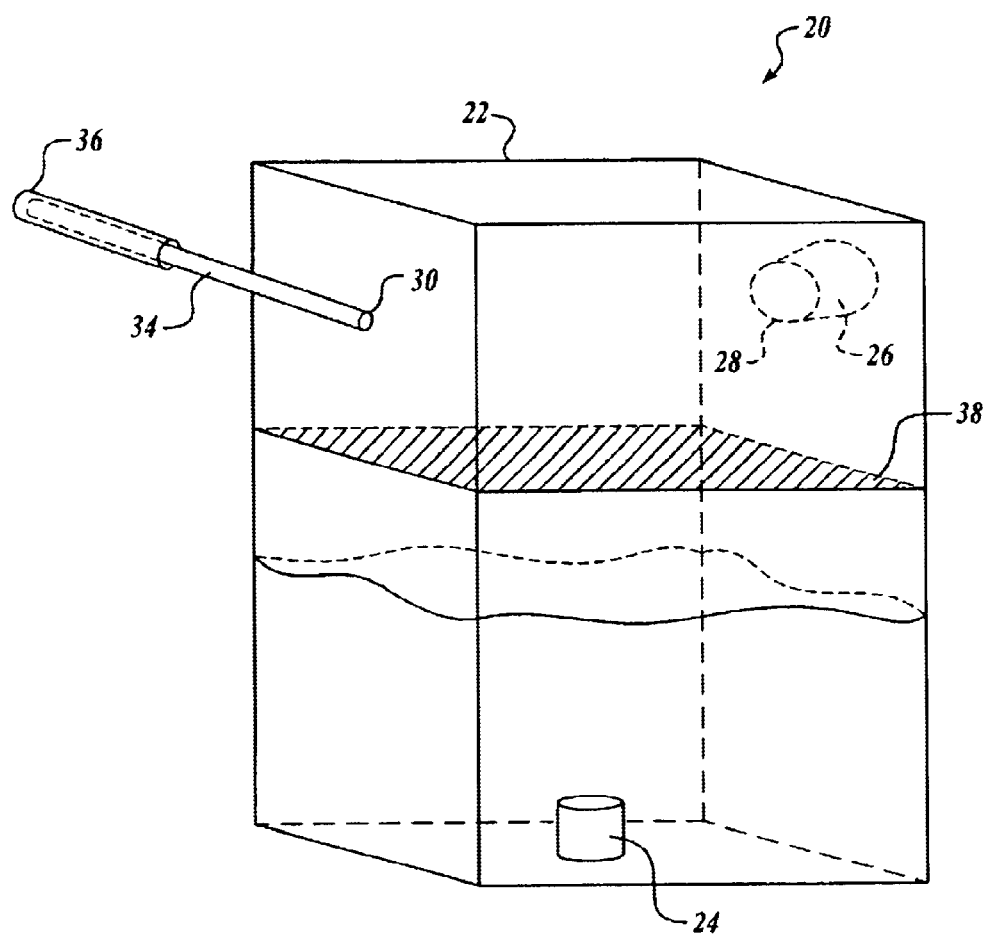
FIG. 1 illustrates an x-ray side view of an exemplary mist generating device formed in accordance with the present invention.

FIG. 1 illustrates a non-limiting example of a mist generating device 20 that generates a mist for use in detecting leaks around a door seal. The device 20 suitably detects leaks that may exist around a pressurized door (e.g. aircraft passenger door).

A presently preferred embodiment of the device 20 includes a container 22 that is filled to a predefined level of a liquid with fluorescent dye. Fluorescein, produced by Anderson Laboratories, is a non-limiting example of a fluorescent dye solution suitably used in the present invention. A mist generating device 24 is positioned in the liquid. An exemplary mist generating device 24 is an ultra-sonic device, such as that produced by Nanhai Gentle Electronic Co. A fan 26 is mounted to the container 22 in an acceptable manner at a first opening 28 above the level of the dye solution. The fan 26 pushes air through the first opening 28 into the container 22. Non-limiting examples of the fan 26 include axial and centrifugal fans. The fan 26 and the mist generating device 24 are suitably powered via AC or DC. The container 22 includes a second opening 30 that receives an output nozzle 34. The container 22 is also suitably configured with a cap or a cover (not shown) that allows for the addition or removal of the mist generating device 24 or the liquid. In the configuration shown, mist generated by the mist generating device 24 is blown out the output nozzle 34 by the fan 26.

In one embodiment of the present invention, the output nozzle 34 is made of metal tubing, such as without limitation titanium. The device 20 includes a semi-rigid plastic sleeve 36 that is suitably sized to receive the nozzle 34. The plastic sleeve 36 protects seals from being damaged by the metal nozzle 34.

In another embodiment of the present invention, a semi-permeable membrane 38 is attached to the insides of the container 22 at a position above the top of the fluid and below the fan 26 and output nozzle 34. The semi-permeable membrane 38, such as a slotted plastic member, is used to allow mist generated by the mist generating device 24 to pass through, and prevent the passage of drops of water that may be generated by the mist generating device 24.

The mist generating device 20 is suitably a hand-held device that allows a user to position the device 20 at various locations along the edge of a door thereby allowing a generated mist to be disbursed at various points around a door-bulkhead interface.

Figure 2:
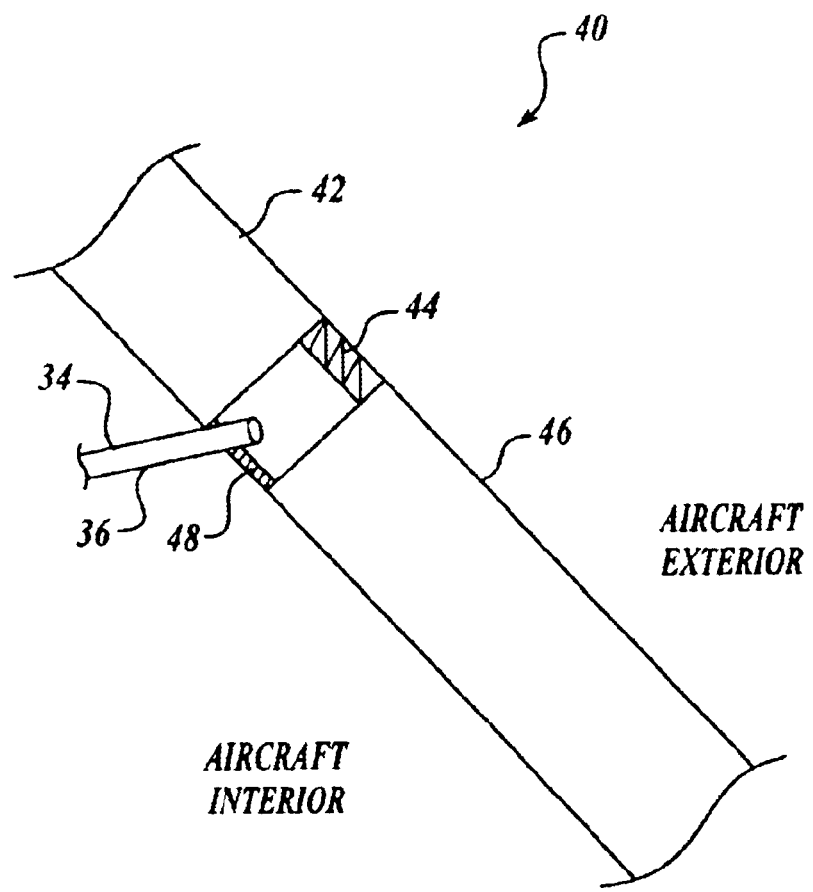
FIG. 2 illustrates a cutaway top down view of the exemplary device shown in FIG. 1 used within the seal between a bulkhead and a door.
Figure 3:
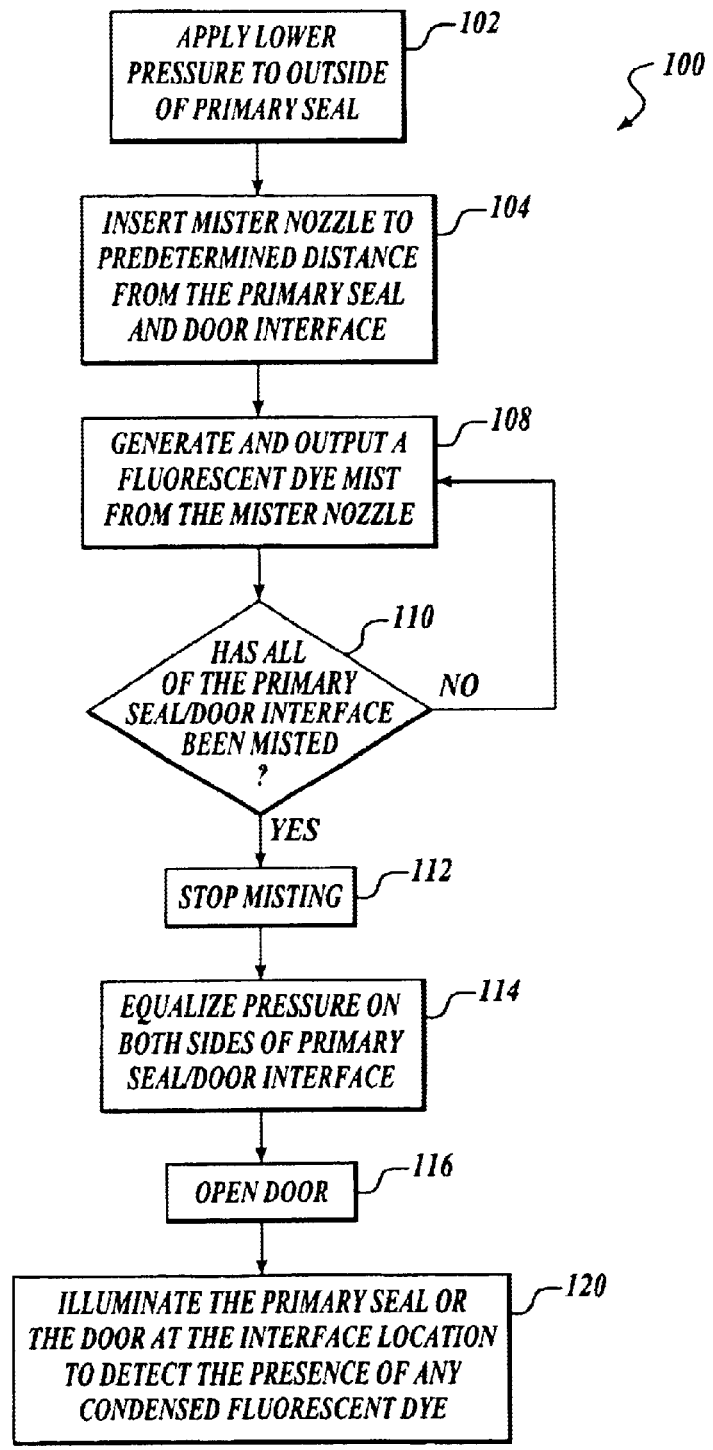
FIG. 3 illustrates an example process performed in accordance with the present invention to determine leaks along a seal of a door.

FIG. 2 illustrates a cutaway view of the device 20 in use with an aircraft passenger door system 40 that is in a closed position. The door system 40 includes a bulkhead 42 with a primary seal 44 and a door 46 with an inner seal 48. The primary seal 44 provides the primary airlock between the exterior of the aircraft and the interior of the aircraft. The inner seal 48 is a noise deterrent device. In order to test for leaks at the primary seal 44, the sleeve 36 is inserted between the inner seal 48 the bulkhead 42. The nozzle 34 is then inserted into the sleeve 36. The insertion of the nozzle 34 in the sleeve 36 can also be done simultaneously. If desired, the sleeve 36 is suitably not used at all, whereby the nozzle 34 is directly inserted between the inner seal 48 the bulkhead 42. The user then activates the device 20, thereby generating a mist that is deposited in the area between the door 46 and the bulkhead 42. It will be appreciated that other door and seal configurations of various vehicles can be tested for leaks using the system 20.

The device 20 is activated on the ground with a simulated partial vacuum applied to the aircraft exterior side of the door system 40 or in flight where lower pressure exists on the aircraft exterior side of the door system 40. Because of the lower pressure simulated on the ground or existing during an in-flight test, a leak between the door 46 and the primary seal 44 draws mist generated by the mister through the leak. The pressure on both sides of the door system 40 is equalized, the door 46 is opened, and the primary seal 44 is illuminated with an ultraviolet light or black light (not shown). The light illuminates any mist that has condensed on the seal 44, thereby indicating the presence of a leak. It will be appreciated that the liquid in the container could be a non-fluorescent colored liquid. In this alternate embodiment, the illuminating light includes a filter that illuminates to a viewer any non-fluorescent colored liquid present.

FIG. 3 illustrates an exemplary process 100 performed in order to detect leaks using the device 20. First, at block 102, lower pressure is applied to the outside of the primary seal 44. Next, at block 104, the nozzle 34 of the device 20 is inserted past the inner seal 48 of the door 46 at a predetermined distance from the primary seal. The predetermined distance is based on fan size and power, quantity of mist generated, nozzle size, or other factors. At block 108, the device 20 generates a fluorescent mist into the cavity between the door and the bulkhead 42. The mister nozzle 34 is positioned past the inner seal 48 in order to allow the generated fluorescent mist to occupy the cavity between the door 46 and bulkhead 42. At a decision block 110, mist is applied until the entire seal 44 of the door 46 has been properly misted. At a block 112, the misting is stopped once the mist has been determined to have been properly applied. At a block 114, after completion of the misting, the pressure on both sides of the door 46 is equalized. At a block 116, the door 46 is opened. At a block 120, the primary seal 44 is illuminated by an ultraviolet light, or black light, thereby detecting any fluorescent mist that has condensed on the primary seal 44. If any condensed fluorescent mist has dried before illumination can occur, residue will remain provided the fluorescent dye solution is of the type, such as Fluorescein, that turns into powder when dried.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for determining air leaks through a seal that separates a first and second volume, the method comprising:

generating a detectable mist;

applying the detectable mist in the first volume, wherein the first volume has a first pressure value and the second volume has a second pressure value, the second pressure value having a lower pressure than the first pressure value;

after applying the detectable mist, equilibrating the pressures between the first and second volumes; and illuminating a surface of the seal adjacent to the first volume to determine if any condensed mist is present, thereby determining if a leak of the seal has occurred.

2. The method of claim 1, wherein the detectable mist is generated from a fluorescent dye fluid.

3. The method of claim 1, wherein the seal is between a door and a bulkhead of an aircraft.

4. A method for determining leaks through a seal that separates a first and second volume, the method comprising:

generating a detectable mist;

applying the detectable mist in the first volume, wherein the first volume has a first pressure value and the second volume has a second pressure value, the second pressure value having a lower pressure than the first pressure value;

after applying the detectable mist, equalizing the pressure values between the first and second volumes; and illuminating a surface of the seal proximate the first volume to determine if any condensed mist is present, thereby determining if a leak of the seal has occurred.

5. The method of claim 4, wherein the detectable mist is generated from a fluorescent dye solution.

6. The method of claim 4, wherein the seal is between a door and a bulkhead of an aircraft.

* * * * *